Nov. 6, 1934.   J. C. HODGE ET AL   1,979,264
WELDING ELECTRODE
Filed Feb. 20, 1932

Coated Electrode
Deposited Metal
Enfolded Slag
Side Wall Cutting
Defective Weld

Silica
+
Asbestos+Water Glass
+
a high percent of any
one of the following, or
a combination thereof
$V_2O_5$
$Cr_2O_3$
$MnO_2$
$Fe_3O_4$
$NiO$
$CoO$ INVENTOR
James C. Hodge
BY Magnus Christensen
ATTORNEY Patented Nov. 6, 1934

1,979,264

UNITED STATES PATENT OFFICE 1,979,264

WELDING ELECTRODE

James C. Hodge and Magnus Christensen, Barberton, Ohio, assignors to The Babcock & Wilcox Company, Bayonne, N. J., a corporation of New Jersey Application February 20, 1932, Serial No. 594,160

10 Claims. (Cl. 219—8)

The invention here presented is the welding or forming of adjacent, or contiguous metal parts in an integral manner by a deposited metal portion having physical and chemical characteristics at least as desirable as the components united, and whereby the union thus effected is the equivalent, if not superior in integrity to the main or parent metal bodies thus joined.

More specifically it may be said that the present invention comprises the joining of metal parts in permanently united relation by establishing conditions sympathetic to the formation of a deposited portion, miscible with respect to the metals united, thereby providing a fault free metal bond having properties equal to, or better than the parent metal and having a factor of safety comparable to the safety factor of any section of the total structure, a feature of prime importance in any weld, and especially so in connection with the formation of metal drums called upon to withstand extremely high pressure.

Previously, numerous attempts have been made to arrive at the aforesaid result, and many of these, especially in arc welding, have been associated with the use of covered or coated electrodes bearing substances deterrent to the formation of oxides, nitrides and the occlusion of gases; likewise, many processes have been utilized in which the formation of a slag coating has assisted in protecting the weld, but such coatings as have been used have generally had two objects, first, simply to cover the molten metal with a slag coating floating on the molten metal to decrease oxidation and, secondly, to provide a neutral or reducing atmosphere also decreasing oxidation, both functioning toward the elimination from the weld of oxides, nitrides and occluded gases; these features have contributed most importantly in advancing the art of arc welding, but they have failed to take into consideration that more than ordinary skill is required of the operator in order to prevent the inclusion in the weld of particles of slag which materially weaken the weld. A wide seam has been necessary, due to the position in which the electrode had to be held with respect to the side walls of the seam, and, in so doing not only was slag included in the weld but one cannot avoid damage to the side walls of the parent metal, thus resulting in a uniting bond of large dimension and in which the chance for inclusion of weakening factors is much greater than with a narrow weld.

This invention contemplates a fault free seam made possible by the characteristics of the electrodes presently to be described having coverings or coatings containing a large percentage of any one of several mineral oxides all of which reside within a certain substantially continuous series in the periodic system by which their chemical combining weights are identifiable, and which by virtue of the coating are unusually conducive to the production of deposited weld metal having the requisite denseness, ductility, tensile strength and other properties to insure a good weld, the coating providing a slag over the deposited weld metal which wets, scours and cleanses the underlying and contacting metal; the slag being of such character as to assist the transfer through the arc of only small globules of molten metal in a substantially continuous manner.

The materials of the coating or cover on the electrodes of the present invention under the heat of welding produce a metal wetting slag having a different surface tension phenomena than previously used slags and which, by reason of this, evidences an increased capillarity where the molten weld metal contacts with the metal walls permitting the surface of the molten metal bead to assume a concave fillet along the edges which promotes the exclusion of slag, insuring a fault free weld as contradistinguished from previous methods which produce a convex fillet fostering the enfolding of slag particles in the molten metal at the edges to the detriment of the weld.

And also by reason of this surface tension phenomena of the slag the metal sides of the parent metal may be, if desired, much closer together than in previous practice, thereby producing a uniform joint of minimum dimensions without fear of slag being entrapped along the sides of the joint.

Also, the slag formed by the electrode covering in this invention is inherently cellular and thereby maintains the heat in the deposited metal for a longer time than is the case in the thin slag coatings so universally sought in the past, and the retention of this heat tends to maintain the metal molten for a sufficient length of time to heat treat the metal layers, and by reason of the umbrella like effect of the molten slag preventing gases from getting in it, contributes to a solid weld devoid of gas pockets. This slag also has a coefficient of contraction so widely divergent with respect to the metal that, unlike previously used slag formations, it virtually frees itself from the metal, there being practically no tendency to adhere, a feature of paramount importance in connection with multiple bead welding where the underlying beads must be thoroughly cleared of slag before depositing the next bead; likewise the surface tension phenomena hereinbefore referred to as producing a concave instead of a convex fillet renders slag freeing easier for the convex or enfolded bead has a tendency to cause the slag to adhere.

From the foregoing it will also be obvious that the slag of the present invention is metal wetting, scouring and cleansing in its action.

In the drawing forming a part of this specification—

The electrode of the present invention includes the mild steel core 1, more or less corresponding in properties to the parent metal, surrounded by a coating 2 containing slag forming elements such, for instance, as acid open hearth slag, asbestos and a binder, all of said elements being capable of producing a mixture having a high percentage of silica and a high percentage of some metal oxide or combination of metal oxides, as for instance manganous oxide and ferrous oxide, so that when the coated rod is brought into welding relation with respect to the parts to be united and the heat of the arc is brought into play, there is formed from the mixture without the liberation of gases, a slag which wets, cleans and scours the metal and a deposited portion which is protected by the slag and becomes miscible with the metals of the parts to be joined to form a dense, ductile weld, the character of the slag producing the surface tension phenomena heretofore referred to is such that the molten metal is deposited in small globules through the arc and forms a pool possessing appreciable capillarity at the juncture between the parent metal and the weld metal, and with a fillet curve which is concave and thereby prevents the enfoldment of slag in the weld as the slag floats on the weld metal. Furthermore, the floating slag by its umbrella action over the arc minimizes any inclusion of oxides and nitrides in the weld, and is of a cellular character of poor thermal conductivity, permitting slow cooling of the weld metal.

Such a sequence in the periodic system of elements having atomic weights between 50 and 62 and suitable for use as oxides, or other compounds, in the coating of the welding rod are vanadium, manganese, iron, nickel, cobalt, copper and zinc, but that found to be the most practical by reason of its low cost and good results is manganese dioxide, which when incorporated in a mixture containing as high as 50% silica and 49% manganese oxides, gives a weld of excellent character with a denseness, ductility and tensile strength comparable to the parent metal, the slag acting as a flux while at the same time performing its other functions in connection with regulating the surface tension phenomena hereinbefore referred to, maintaining the heat of the metal, and finally contracting with a coefficient so widely divergent with respect to that of the metal that it is easily removed.

Figure 2:
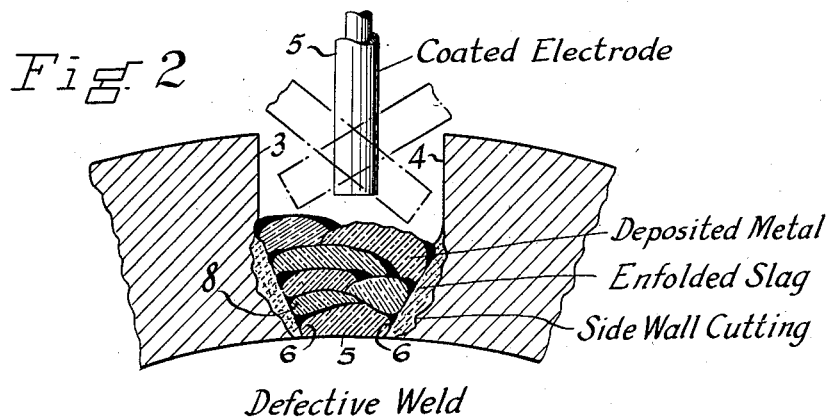
Fig. 2 is illustrative of the usual manner of practicing arc welding by bead deposition of metal.
Figure 3:
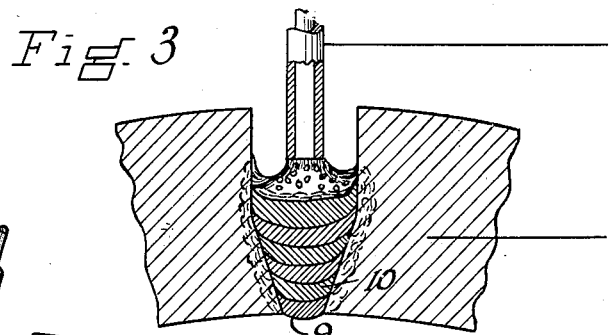
Fig. 3 is illustrative of a weld being produced by practicing the present invention.
Figure 5:
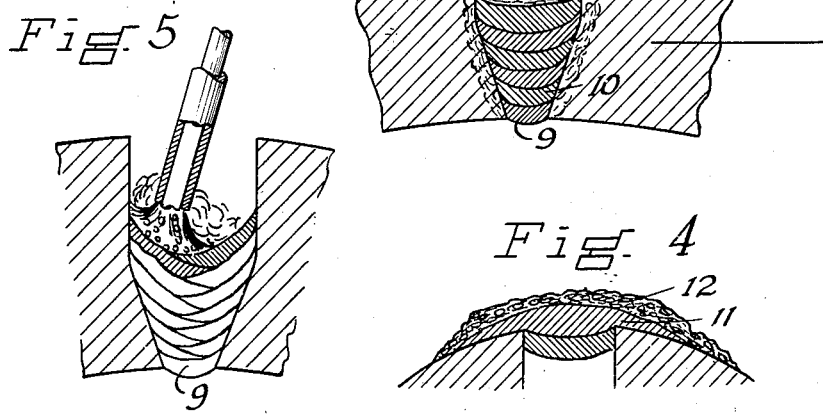
Fig. 5 is a view showing a wider weld than Figs. 3 and 4 being produced according to the present invention.
Figure 4:
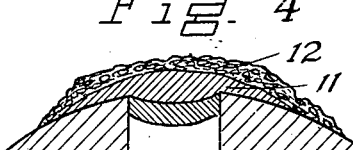
Fig. 4 illustrates the finishing of the weld shown in Fig. 3.
Figure 1:
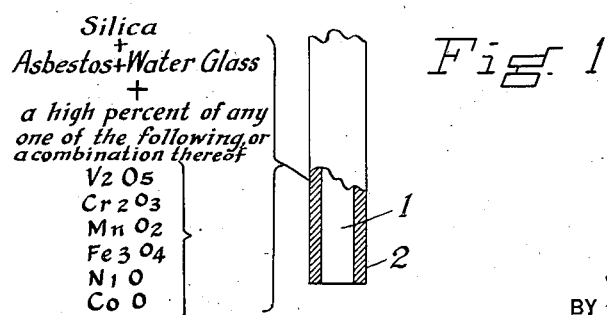
Fig. 1 shows a coated electrode according to the present invention.

In the drawing Fig. 2 represents a weld made with a slag by the old method and in which the metal surfaces 3 and 4 joined by an arc created through the coated electrode 5 must be maintained sufficiently wide apart to permit directing the arc with the electrode approximately normal to the walls of the joint or seam. The first layer 5 deposited carries a coating of slag, and the sides 6 thereof where they join the parent metal have convex menisci which holds the slag as indicated by the darkened portions of the drawing, so that upon the depositing of the next bead 8 there is an enfoldment of the slag or a tendency to leave some of it in the fillet as indicated by the darkened portions, each succeeding layer or bead resulting in a further inclusion of slag until the finished weld has such a portion of slag included therein as to render the safety factor of the weld uncertain.

As contradistinguished from the description of the defective weld in Fig. 2, an effective weld is produced in the present invention by the utilization of the coated electrode of the type described in which there is formed a slag wetting the sides of the parent metal so that the bead deposited as indicated at 9 assumes a concave surface of metal at the sides of the parent metal, and which thus presents to the slag a concave surface with no pockets or fillets of the character set forth in connection with Fig. 2, and from which the slag may be immediately and conveniently removed due to its non-adhesion, and so on through the course of beads or layers until the top is reached, where the final layer 11 overlying the successively deposited beads, overlies also to a certain extent the surface of the parent metals welded and carries a coating of cellular slag 12 having ability to retain the heat in the metal of the last layer deposited as it has done in the preceding layer.

In welding practice "covering" has a distinct and separate meaning from "coated" with respect to weld rod electrodes, and in the invention herein set forth it is to be understood that we refer to a covering as defined in welding practice and recognized as being of appreciable thickness.

Also, as required by statute for the purpose of disclosing the invention, the following sets forth one of a number of specific formulæ which have been successfully used in practicing the invention:

| | |
|---|---|
| Flint (100 mesh) | 150 grams |
| Manganese dioxide | 75 grams |
| $Fe_3O_4$ | 75 grams |
| Asbestos | 30 grams |
| FeMn(Std 80) | 60 grams |
| Sodium silicate | 200 cc. |

The pulverized materials are mixed and the sodium silicate added to act as a binder, the asbestos also acting as a fibrous element to maintain the integrity of the coating.

While, in the foregoing, we have described certain ingredients and procedure with respect to the process herein set forth, it is nevertheless to be understood that in carrying the same into practice we may resort to any modification which falls within the scope of the appended claims defining the invention.

What is claimed is:

1. A metallic weldrod in combination with a compound having included therein metallic oxide liberating oxygen under welding conditions, and a manganese metal at least in sufficient quantity to chemically combine with substantially all of the oxygen liberated by the reduction of the aforesaid metallic oxide.

2. A metallic weldrod in combination with a compound formed of a mixture of the higher oxides of iron and manganese, and a sufficient amount of ferro-manganese or manganese metal to reduce the said higher oxides to oxides of iron and manganese of low valence.

3. A metallic weldrod in combination with a compound having included therein manganese dioxide liberating oxygen under welding conditions, and a manganese metal at least in sufficient quantity to chemically combine with substantially all of the oxygen liberated by the reduction of the aforesaid manganese dioxide, the said compound also including sufficient ferromanganese to degasify the weld metal.

4. A metallic weldrod in combination with a compound including therein the higher oxides of iron, and a reducing agent in sufficient quantity to effect a reduction of these higher oxides of iron to a lower oxide under welding conditions, the said compound also including sufficient ferromanganese to degasify the weld metal.

5. A metallic weldrod in combination with a compound formed of a mixture of the higher oxides of iron and manganese, and a sufficient amount of ferro-manganese or manganese metal to reduce the said higher oxides to oxides of iron and manganese of low valence, the said compound also including sufficient ferro-manganese to degasify the weld metal.

6. A metallic weldrod in combination with a compound embodying oxygen liberating higher oxides of iron and manganese and ferro-manganese or manganese in an amount combining chemically with an amount of oxygen equal to at least one to two times the amount of oxygen liberated in the reduction of such higher oxides of iron and manganese.

7. A metallic weldrod in combination with a compound formed of a mixture of the higher oxides of metals and a reducing agent to convert the same to oxides of lower valence at welding temperatures, the said compound also including a degasifying agent.

8. A metallic weldrod in combination with a compound having included therein metallic oxides liberating oxygen under welding conditions, additional substances proportioned to chemically combine with at least all of the liberated oxygen, and silica in an amount producing a slag of higher silicate degree than a mono-silicate.

9. A slag producing weld rod comprising a metal core, and a coating including metallic oxide locally releasing oxygen in a welding zone, and also including a reducing agent formed of a metal different from that of the core and proportioned with respect to the oxide to combine with at least all of the oxygen locally released by the aforesaid metallic oxide when heated as in welding.

10. A weld rod comprising a metal core, and a metal wetting slag producing coating including metallic oxide locally releasing oxygen when heated and also including a reducing agent formed of a metal different from that of the core and proportioned with respect to the oxide to combine with at least all of the oxygen locally released by the aforesaid metallic oxide when heated as in welding.

JAMES C. HODGE.
MAGNUS CHRISTENSEN.